United States Patent
Yiu et al.

(10) Patent No.: US 12,081,461 B2
(45) Date of Patent: Sep. 3, 2024

(54) USER EQUIPMENT RADIO FREQUENCY AND BAND CAPABILITY FOR CARRIER AGGREGATION MEASUREMENT GAP

(71) Applicant: Apple Inc., Cupertino, CA (US)

(72) Inventors: Candy Yiu, Portland, OR (US); Hong He, Beijing (CN); Yang Tang, Pleasanton, CA (US); Youn Hyoung Heo, Seoul (KR)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/748,977

(22) Filed: Jan. 22, 2020

(65) Prior Publication Data

US 2020/0244409 A1  Jul. 30, 2020

Related U.S. Application Data

(63) Continuation of application No. 15/542,260, filed as application No. PCT/US2015/065519 on Dec. 14, 2015, now Pat. No. 10,560,232.

(60) Provisional application No. 62/145,414, filed on Apr. 9, 2015.

(51) Int. Cl.
   *H04W 24/10* (2009.01)
   *H04L 5/00* (2006.01)
   *H04W 8/24* (2009.01)

(52) U.S. Cl.
   CPC ............ *H04L 5/001* (2013.01); *H04L 5/0091* (2013.01); *H04W 24/10* (2013.01); *H04W 8/24* (2013.01)

(58) Field of Classification Search
   CPC ...... H04L 5/001; H04L 5/0091; H04W 24/10; H04W 8/24
   See application file for complete search history.

(56) References Cited

U.S. PATENT DOCUMENTS

| | | | |
|---|---|---|---|
| 10,531,355 B2* | 1/2020 | Xu | ...................... H04W 36/385 |
| 2011/0274007 A1 | 11/2011 | Lin et al. | |
| 2012/0178465 A1 | 7/2012 | Lin et al. | |
| 2012/0231782 A1* | 9/2012 | Hellander | ............. H04W 24/10 |
| | | | 455/422.1 |

(Continued)

FOREIGN PATENT DOCUMENTS

| | | |
|---|---|---|
| CN | 102325334 | 1/2012 |
| CN | 102714816 | 10/2012 |

(Continued)

OTHER PUBLICATIONS

NTT Docomo Inc., "Small Gap Measurement in Rel-12", 3GPP TSG-RAN WG4#72bis R4-145958, Oct. 10, 2014, 8 sheets.

(Continued)

*Primary Examiner* — Syed Ali
(74) *Attorney, Agent, or Firm* — Fay Kaplun & Marcin, LLP

(57) ABSTRACT

Briefly, in accordance with one or more embodiments, user equipment (UE) comprising circuitry to connect to a network via a serving cell; and indicate to the network a measurement gap capability of the UE. The measurement gap capability includes information if the UE supports a carrier aggregation (CA) specific measurement gap and if the UE has two or more radio-frequency (RF) chains. The UE then receives a CA specific measurement gap configuration from the network for the two or more RF chains.

11 Claims, 6 Drawing Sheets

(56) References Cited

U.S. PATENT DOCUMENTS

| | | | | |
|---|---|---|---|---|
| 2016/0057644 A1* | 2/2016 | Sebire | ................... | H04W 24/02 |
| | | | | 370/252 |
| 2017/0339679 A1* | 11/2017 | Lee | ................... | H04W 72/0446 |
| 2018/0007731 A1* | 1/2018 | Park | ........................ | H04L 5/001 |
| 2018/0034598 A1* | 2/2018 | Yiu | ................... | H04W 36/0094 |
| 2018/0083748 A1* | 3/2018 | Tang | ..................... | H04L 5/0032 |
| 2018/0084448 A1* | 3/2018 | Yang | ....................... | H04L 5/003 |

FOREIGN PATENT DOCUMENTS

| | | |
|---|---|---|
| JP | 2014-506421 | 3/2014 |
| WO | 2014/052412 | 4/2014 |

OTHER PUBLICATIONS

NSN, Nokia Corporation, "Solution for PCell Interruption in Rel-12", 3GPP TSG-RAN WG4 #71, May 19-23, 2014, 4 sheets.

Broadcom Corporation, "Measurement gap configuration for Dual Connectivity", 3GPP TSG-RAN WG2 Meeting #85bis, R2-142129, May 9, 2014, 6 sheets.

* cited by examiner

USER EQUIPMENT RADIO FREQUENCY AND BAND CAPABILITY FOR CARRIER AGGREGATION MEASUREMENT GAP

CROSS-REFERENCE TO RELATED APPLICATIONS

The present application claims the benefit of U.S. Provisional Application No. 62/145,414 filed Apr. 9, 2015 (P83806Z). Said Application No. 62/145,414 is hereby incorporated herein by reference in its entirety.

BACKGROUND

In the current Long Term Evolution (LTE) standard for the measurement gap, the only configuration received from the network is the gap repetition period and the new performance groups that are introduced for inter-frequency/inter-radio access technology (RAT) measurement. One configuration is a normal performance group, and the other configuration is a reduced performance group. The carriers that belong to each performance group are configured by the network. Each performance group has a different measurement requirement to support an increased number of carriers in LTE. The user equipment (UE) can relax the number of measurements in the carriers that belongs to the reduced performance group so the overall delay of all the carriers can be reduced. This arrangement, however, cannot be utilized when the UE has multiple radio-frequency (RF) chains.

In further enhancements of the LTE standard, one objectives is to identify necessary mechanisms to enable LTE carrier aggregation (CA) of up to 32 Component Carriers (CCs) for the downlink (DL) and the uplink (UL). For carrier aggregation, two measurement performance groups may not be enough if LTE carrier aggregation supports up to 32 CCs.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
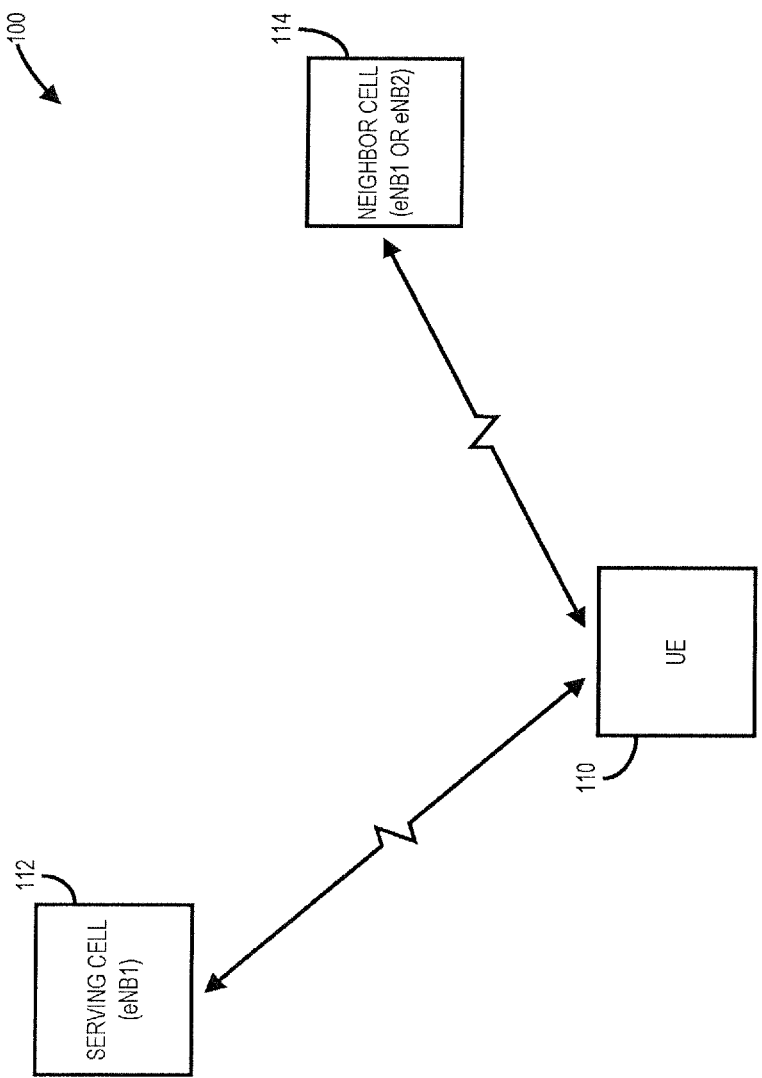
FIG. 1 is a diagram of a network having a user equipment capable of measuring signal levels on one or more frequencies in designated measurement gaps in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of a network having a user equipment capable of measuring signal levels on one or more frequencies in designated measurement gaps in accordance with one or more embodiments will be discussed. As shown in FIG. 1, network 100 may comprise a wireless wide area network (WWAN) operating in accordance with a Third Generation Partnership Project (3GPP) standard such as a Long Term Evolution (LTE) standard or an LTE-Advanced (LTE-A) standard, although the scope of the claimed subject matter is not limited in this respect. The UE 110 may be communicatively coupled with a serving cell 112 which may comprise a first evolved Node B (eNB1). In one or more embodiments, during measurement gaps designated by eNB1, the UE 110 will measure downlink (DL) frequency or frequencies of one or more serving cells such as serving cell 114 deployed on neighbor eNB, for example to measure RSRP during a given measurement gap period, and then provides the measurements reporting to the eNB1. Such measurement gaps configurations are specified and signaled by means of dedicated signaling for the UE 110 such that no downlink or uplink scheduling between the UE 110 and the service cell 112 occurs to allow the UE to perform measurements on the one or more given frequencies. In some embodiments, the neighbor cell 114 may comprise a small cell or remote radio head (RRH) coupled to the eNB, such as eNB1, of the serving cell. In such embodiments, neighbor cell 114 may comprise a micro cell, a pico cell, a femto cell, and so on. In other embodiments, neighbor cell 114 may comprise or otherwise be connected with a different eNB than the serving cell 112. For example, neighbor cell 114 may comprise eNB2 or otherwise be connected with eNB2. The measurement results obtained by the UE 110 for the one or more neighbors cells 114 allow the eNB1 to determine whether to handover the UE 110 to a new cell or eNB, for example if the signal levels with a neighboring cell are better than the signal levels for the serving cell 112.

The measurement gaps configuration is provided by the network 100 to the UE 110 via the serving cell 112. In accordance with one or more embodiments, the UE 110 may indicate to the network 100 the radio-frequency (RF) capability and the band capability of the UE 110 so that the network 110 can configure cell-group specific measurement for carrier aggregation to reduce measurement delay and/or increase the downlink date rate if the UE 110 has two or more RF chains and is capable of operating on multiple frequency bands for the two or more RF chains. An example of such as UE 110 having multiple RF chains operating on multiple frequency bands is shown in and described with respect to FIG. 2, below.

Figure 2:
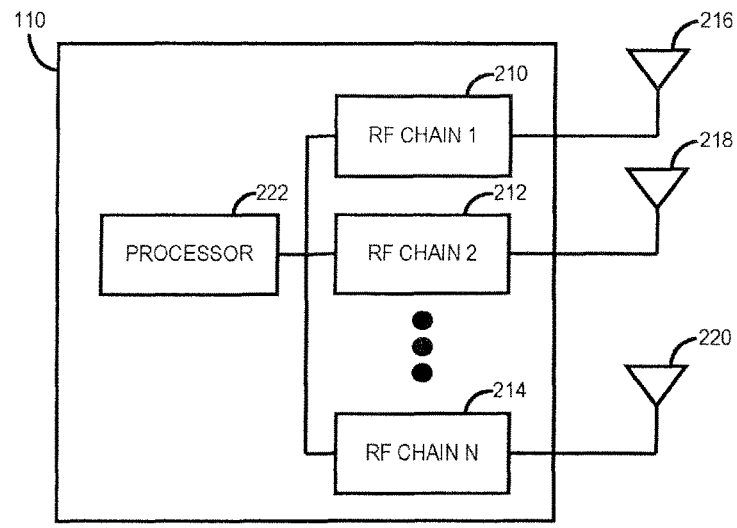
FIG. 2 is a diagram of a user equipment having multiple radio-frequency (RF) chains in accordance with one or more embodiments.

Referring now to FIG. 2, a diagram of a user equipment having multiple radio-frequency (RF) chains in accordance with one or more embodiments will be discussed. As shown in FIG. 2, the UE 110 may include multiple radio-frequency (RF) chains such as RF chain 1 (RF CHAIN 1) 210, RF chain 2 (RF CHAIN 2) 212, up to an Nth RF chain (RF CHAIN N) 214. The RF chains may be coupled to multiple antennas such as antenna 216, antenna 218, and antenna 220, respectively, and the RF chains may be controlled by a processor 222. In one more embodiments, one or more of the RF chains may be capable of operating on one or more frequency bands to transmit and/or receive data in the uplink and/or the downlink. An example of the RF chains having multiple frequency bands is shown in and described with respect to FIG. 3, below.

Figure 3:
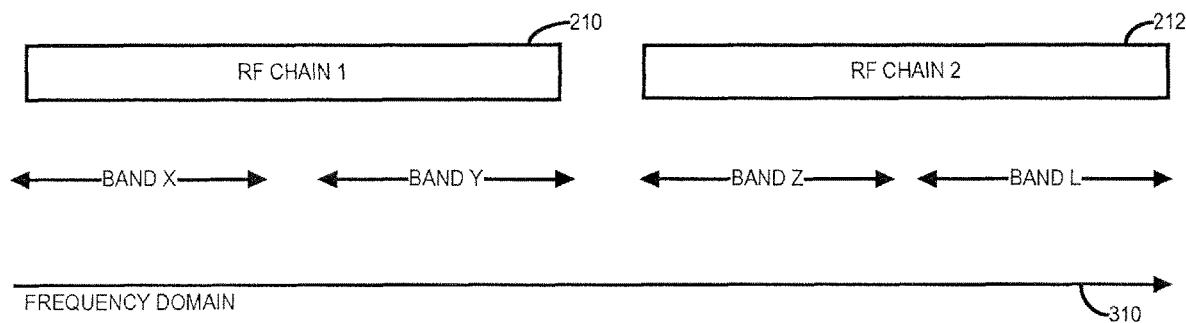
FIG. 3 is a diagram of an RF structure for the user equipment of FIG. 2 in accordance with one or more embodiments.

Referring now to FIG. 3, a diagram of an RF structure for the user equipment of FIG. 2 in accordance with one or more embodiments will be discussed. FIG. 3 shows an example of the radio-frequency (RF) structure for the UE 110. It should be noted that the RF arrangement shown in FIG. 3 is merely one example, and the UE 110 may have various other arrangements of RF chains and frequency bends, and the scope of the claimed subject matter is not limited in these respects. In the example shown in FIG. 3, the UE 110 may have two RF chains, RF chain 1 (RF CHAIN 1) 210 and RF chain 1 (RF CHAIN 2) 212. RF chain 1 may be capable of supporting band X and band Y. RF chain 2 may be capable of supporting band Z and band L.

In this example, since the UE 110 has more than one RF chain, the UE 110 is capable of using both RF chains for gap measurements to reduce measurement delay and/or to increase spectrum efficiency. Under current specifications the network 100 is not able to utilize the multiple RF chains implemented at the UE 100 due to lack of this kind of information. Therefore, in order to achieve different and resource-efficient measurement patterns for carrier aggregation (CA) or for other features or other gap, in one or more embodiments the network 100 receives indication from the UE 100 about the RF capability of the UE 110. Several embodiments for the UE 110 to indicate to the network 100 the RF capability are discussed herein.

In a first embodiment, the UE 110 may indicate to the network 110 whether it supports carrier aggregation specific measurement gap capability. Such an indication may be made by the UE 11o via the UE-EUTRA-Capability information element (IE) to convey the E-UTRA UE Radio Access Capability Parameters, and the Feature Group Indicators for mandatory features to the network 100. The UE-EUTRA-Capability IE may be transferred to network 100 via evolved Universal Mobile Telecommunications System (UMTS) Terrestrial Radio Access (E-UTRA) or via another radio access technology (RAT). An example of such an UE-EUTRA-Capability IE is shown, below.

```
-- ASN1START
...
UE-EUTRA-Capability-v1250-IEs ::=           SEQUENCE {
    phyLayerParameters-v1250                    PhyLayerParameters-v1250            OPTIONAL,
    rf-Parameters-v1250                         RF-Parameters-v1250                 OPTIONAL,
    rlc-Parameters-r12                          RLC-Parameters-r12                  OPTIONAL,
    ue-BasedNetwPerfMeasParameters-v1250            UE-BasedNetwPerfMeasParameters-v1250
    OPTIONAL,
    ue-CategoryDL-r12                           INTEGER (0..14)                     OPTIONAL,
    ue-CategoryUL-r12                           INTEGER (0..13)                     OPTIONAL,
    wlan-IW-Parameters-r12                          WLAN-IW-Parameters-r12          OPTIONAL,
    measParameters-v1250                        MeasParameters-v1250                OPTIONAL,
    dc-Parameters-r12                           DC-Parameters-r12                   OPTIONAL,
    mbms-Parameters-v1250                           MBMS-Parameters-v1250           OPTIONAL,
    mac-Parameters-r12                              MAC-Parameters-r12              OPTIONAL,
    fdd-Add-UE-EUTRA-Capabilities-v1250             UE-EUTRA-CapabilityAddXDD-Mode-v1250
    OPTIONAL,
    tdd-Add-UE-EUTRA-Capabilities-v1250             UE-EUTRA-CapabilityAddXDD-Mode-v1250
    OPTIONAL,
    sl-Parameters-r12                           SL-Parameters-r12                   OPTIONAL,
    nonCriticalExtension                        UE-EUTRA-Capability-vxxxx-IEs       OPTIONAL
}
UE-EUTRA-Capability-vxxxx-IEs :: SEQUENCE {
    Rf-band-capability                          BOOLEAN                             OPTIONAL,
    ...
}
...
-- ASN1STOP
```

Figure 4:
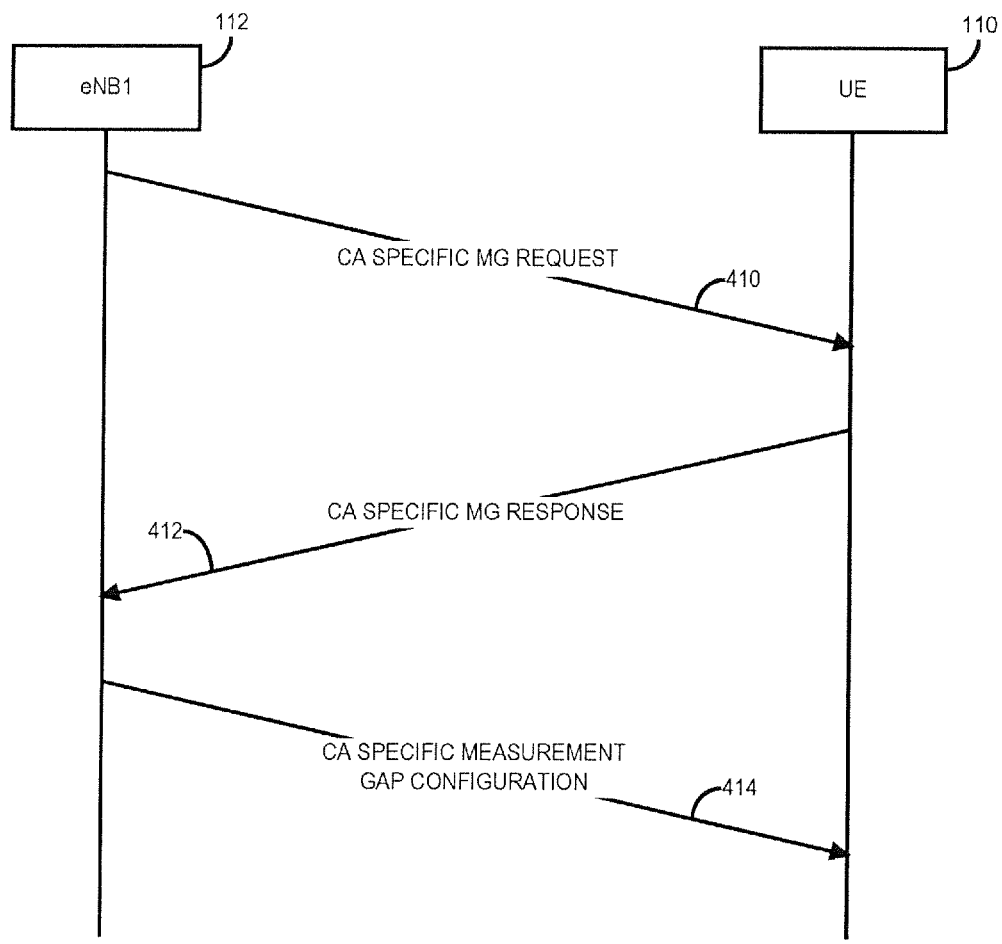
FIG. 4 is a diagram of a signaling flow for a configuration of the network of FIG. 1 in accordance with one or more embodiments.

Referring now to FIG. 4, a diagram of a signaling flow for a configuration of the network of FIG. 1 in accordance with one or more embodiments will be discussed. Another embodiment for the UE 110 to indicate the radio-frequency (RF) capability of the UE 110 to the network 100 may comprise a carrier aggregation (CA) specific gap measurement indication procedure. In such an embodiment, when the UE 110 indicates to the network 100 that the UE 110 supports the carrier aggregation (CA) specific gap measurement indication feature, the network 100 can send the CA specific request to the UE 110 to inquire or trigger the UE 110 to indicate what band and RF combination the UE 110 supports in order for the network 100 to configure one of the available measurement gap patterns. For example, the network 100 may configure a combination of band Y and band Z for carrier aggregation, and the network 100 may configure band X for measurement by the UE 100. The network 100 may then request the UE 110 to indicate if the RF capability of the UE 110 is capable of satisfying measurement band X using RF band Y or RF band Z, or both.

As shown in FIG. 4, the network 100 sends a message including at least a carrier aggregation specific measurement group "CA specific MG request" 410 Information Element (IE) to the UE 110, for example via eNB1 112. This request 410 may contain on which band or bands the network 100 may want the UE 110 to perform measurements. Additionally, this request 410 may contain which CA band combinations or alternatively a list of frequency bands the network 100 is interested in to know measurement capability. By default, the current CA configuration should be considered as the CA band combination that the eNB, eNB1 112, is interested in. To support this, a new IE as discussed herein is provided in the radio resource control (RRC) signaling.

Next, the UE 110 may respond with the preferred measurement gap configuration "CA specific MG response". For example, the UE 110 can inform the requirement of measurement gap and the preferred measurement gap pattern for each serving frequency separately per eNB interest. Alternatively, the UE 110 can inform the requirement of measurement gap and the preferred measurement gap pattern for all supported frequency bands in each serving frequencies in each band combination for all supported band combinations or the requested band combinations. To support this, a new IE as discussed herein is provided m the RRC signaling. Next, the network 100 sends a message including at least a "CA specific measurement gap configuration" 414 IE to the UE 110. The eNB, eNB1 112, can setup a measurement gap pattern for each serving frequency, which means in some instances there may be no measurement gap for one or more serving frequencies.

In another embodiment, a new signal structure is provided to allow the UE 110 to indicate which band combinations require either measurement gap, or mini gap or no gap. In one or more embodiments, the gap type can be a regular measurement gap, a mini gap, or no gap required, or a subset of these gap types, or a combination thereof. The mini gap, which also may be referred to as a small gap or an interruption gap, indicates there will be downlink transmissions on the serving frequency, and the UE 110 can receive the downlink transmissions on the serving frequency using other RF bands or chains with a smaller value of interruption, for example one millisecond or less, when RF tuning happens. Currently, RF implementation is up to the UE 110, and the network 110 has no knowledge of the RF configuration of the UE 110. In order to keep such an arrangement, the UE 110 may indicate if a full measurement gap is required for a band combination without any downlink data transmission during this period, or alternatively a mini gap, or no gap is sufficiently required. For example, using the example of RF capability as shown in FIG. 3, above, the UE 110 may have two RF chains and can support band X and band Y using RF chain 1, and can support band Z and band L using RF chain 2. If the current serving band for the UE 110 is configured with band X for data communication, then the UE 110 implemented with RF chain 1 and 2 as described above should indicate the following RF capability to network:

| Band | Gap Type | Description |
| --- | --- | --- |
| Y | Yes, full gap is required | No downlink transmission from the eNB during the gap |
| Z, L | Mini gap only | If the UE has a separate RF chain and will not have interruption between bands Z and L with the serving band, the UE can use no gap instead |

To allow the UE 110 to indicate the band combination as shown above, a possible information element (IE) may be introduced, as shown below. The UE-EUTRA-Capability IE shown, below, may be used to convey the E-UTRA UE Radio Access Capability Parameters and the Feature Group Indicators for mandatory features to the network 100. The UE-EUTRA-Capability IE, below, may be transferred via E-UTRA or via another RAT.

```
-- ASN1START
...
UE-EUTRA-Capability-v1250-IEs ::=        SEQUENCE {
    phyLayerParameters-v1250             PhyLayerParameters-v1250          OPTIONAL,
    rf-Parameters-v1250                      RF-Parameters-v1250               OPTIONAL,
    rlc-Parameters-r12                       RLC-Parameters-r12                OPTIONAL,
    ue-BasedNetwPerfMeasParameters-v1250         UE-BasedNetwPerfMeasParameters-v1250
    OPTIONAL,
    ue-CategoryDL-r12                    INTEGER (0..14)                   OPTIONAL,
    ue-CategoryUL-r12                    INTEGER (0..13)                   OPTIONAL,
    wlan-IW-Parameters-r12                   WLAN-IW-Parameters-r12            OPTIONAL,
    measParameters-v1250                 MeasParameters-v1250              OPTIONAL,
    dc-Parameters-r12                    DC-Parameters-r12                 OPTIONAL,
    mbms-Parameters-v1250                    MBMS-Parameters-v1250             OPTIONAL,
    mac-Parameters-r12                       MAC-Parameters-r12                OPTIONAL,
    fdd-Add-UE-EUTRA-Capabilities-v1250          UE-EUTRA-CapabilityAddXDD-Mode-v1250
    OPTIONAL,
    tdd-Add-UE-EUTRA-Capabilities-v1250          UE-EUTRA-CapabilityAddXDD-Mode-v1250
    OPTIONAL,
    sl-Parameters-r12                    SL-Parameters-r12                 OPTIONAL,
    nonCriticalExtension                 UE-EUTRA-Capability-vxxxx-IEs     OPTIONAL
}
```

```
-continued

UE-EUTRA-Capability-vxxxx-IEs :: SEQUENCE {
    Rf-band-capability              RF-Band-Capability              OPTIONAL,
    ...
}
RF-Band-Capability :: =             SEQUENCE {
    bandList                        BandInfoEUTRA,
    gapType                         ENUMERATED {NormalMG, MiniMG,NoGap,
spare}
}
...
```

Another UE-EUTRA-Capability as shown, below, also may be used to convey the E-UTRA UE Radio Access Capability Parameters and the Feature Group Indicators for mandatory features to the network. The UE-EUTRA-Capability IE, below, may be transferred via E-UTRA or via another RAT.

```
-- ASN1START
...
UE-EUTRA-Capability-v1250-IEs ::=    SEQUENCE {
    phyLayerParameters-v1250         PhyLayerParameters-v1250        OPTIONAL,
    rf-Parameters-v1250              RF-Parameters-v1250             OPTIONAL,
    rlc-Parameters-r12               RLC-Parameters-r12              OPTIONAL,
    ue-BasedNetwPerfMeasParameters-v1250    UE-BasedNetwPerfMeasParameters-v1250
OPTIONAL,
    ue-CategoryDL-r12                INTEGER (0..14)                 OPTIONAL,
    ue-CategoryUL-r12                INTEGER (0..13)                 OPTIONAL,
    wlan-IW-Parameters-r12           WLAN-IW-Parameters-r12          OPTIONAL,
    measParameters-v1250             MeasParameters-v1250            OPTIONAL,
    dc-Parameters-r12                DC-Parameters-r12               OPTIONAL,
    mbms-Parameters-v1250            MBMS-Parameters-v1250           OPTIONAL,
    mac-Parameters-r12               MAC-Parameters-r12              OPTIONAL,
    fdd-Add-UE-EUTRA-Capabilities-v1250    UE-EUTRA-CapabilityAddXDD-Mode-v1250
OPTIONAL,
    tdd-Add-UE-EUTRA-Capabilities-v1250    UE-EUTRA-CapabilityAddXDD-Mode-v1250
OPTIONAL,
    sl-Parameters-r12                SL-Parameters-r12               OPTIONAL,
    nonCriticalExtension             UE-EUTRA-Capability-vxxxx-IEs   OPTIONAL
}
UE-EUTRA-Capability-vxxxx-IEs :: SEQUENCE {
    Rf-band-capability               RF-Band-Capability              OPTIONAL,
    ...
}
RF-Band-Capability :: =              SEQUENCE {
    bandList                         BandInfoEUTRA,
    gapIsNeeded                      BOOLEAN
}
...
-- ASN1STOP
```

In yet another embodiment, the UE 110 may indicate which RF band combinations that the UE 110 supports In this embodiment, the UE 110 indicate the combination of RF bands the UE 110 supports so the network 110 can configure an optimal measurement gap pattern. For example. RF band combination for the UE 110 may be indicated as follows.

| Band   | RF Index |
|--------|----------|
| A, X, Y | 1       |
| B, Z, L | 2       |

As shown in the above indication, the UE11 has two RF combinations with RF index 1 and RF index 2. RF index 1 can support bands A. X. and Y. RF index 2 can support bands B. Z. and L. The UE 110 may indicate the RF band combinations as shown above using an example information element (IE) as shown below. The UE-EUTRA-Capability IE shown below % may be used to convey the E-UTRA UE Radio Access Capability Parameters and the Feature Group Indicators for mandatory features to the network 100. The UE-EUTRA-Capability IE, below, may be transferred via E-UTRA or via another RAT.

```
-- ASN1START
...
UE-EUTRA-Capability-v1250-IEs ::=        SEQUENCE {
    phyLayerParameters-v1250             PhyLayerParameters-v1250        OPTIONAL,
    rf-Parameters-v1250                  RF-Parameters-v1250             OPTIONAL,
    rlc-Parameters-r12                   RLC-Parameters-r12              OPTIONAL,
    ue-BasedNetwPerfMeasParameters-v1250        UE-BasedNetwPerfMeasParameters-v1250
OPTIONAL,
    ue-CategoryDL-r12                    INTEGER (0..14)                 OPTIONAL,
    ue-CategoryUL-r12                    INTEGER (0..13)                 OPTIONAL,
    wlan-IW-Parameters-r12               WLAN-IW-Parameters-r12          OPTIONAL,
    measParameters-v1250                 MeasParameters-v1250            OPTIONAL,
    dc-Parameters-r12                    DC-Parameters-r12               OPTIONAL,
    mbms-Parameters-v1250                MBMS-Parameters-v1250           OPTIONAL,
    mac-Parameters-r12                   MAC-Parameters-r12              OPTIONAL,
    fdd-Add-UE-EUTRA-Capabilities-v1250         UE-EUTRA-CapabilityAddXDD-Mode-v1250
OPTIONAL,
    tdd-Add-UE-EUTRA-Capabilities-v1250         UE-EUTRA-CapabilityAddXDD-Mode-v1250
OPTIONAL,
    sl-Parameters-r12                    SL-Parameters-r12               OPTIONAL,
    nonCriticalExtension                 UE-EUTRA-Capability-vxxxx-IEs   OPTIONAL
}
UE-EUTRA-Capability-vxxxx-IEs :: SEQUENCE {
    Rf-band-capability                   RF-Band-CapabilityList          OPTIONAL,
    ...
}
RF-Band-CapabilityList :: =              SEQUENCE (SIZE (1..maxRF)) OF PLMN- RF-Band-
Capability
RF-Band-Capability :: =                  SEQUENCE {
    bandList                             BandInfoEUTRA,
}
...
-- AS 1S OP
```

Figure 5:
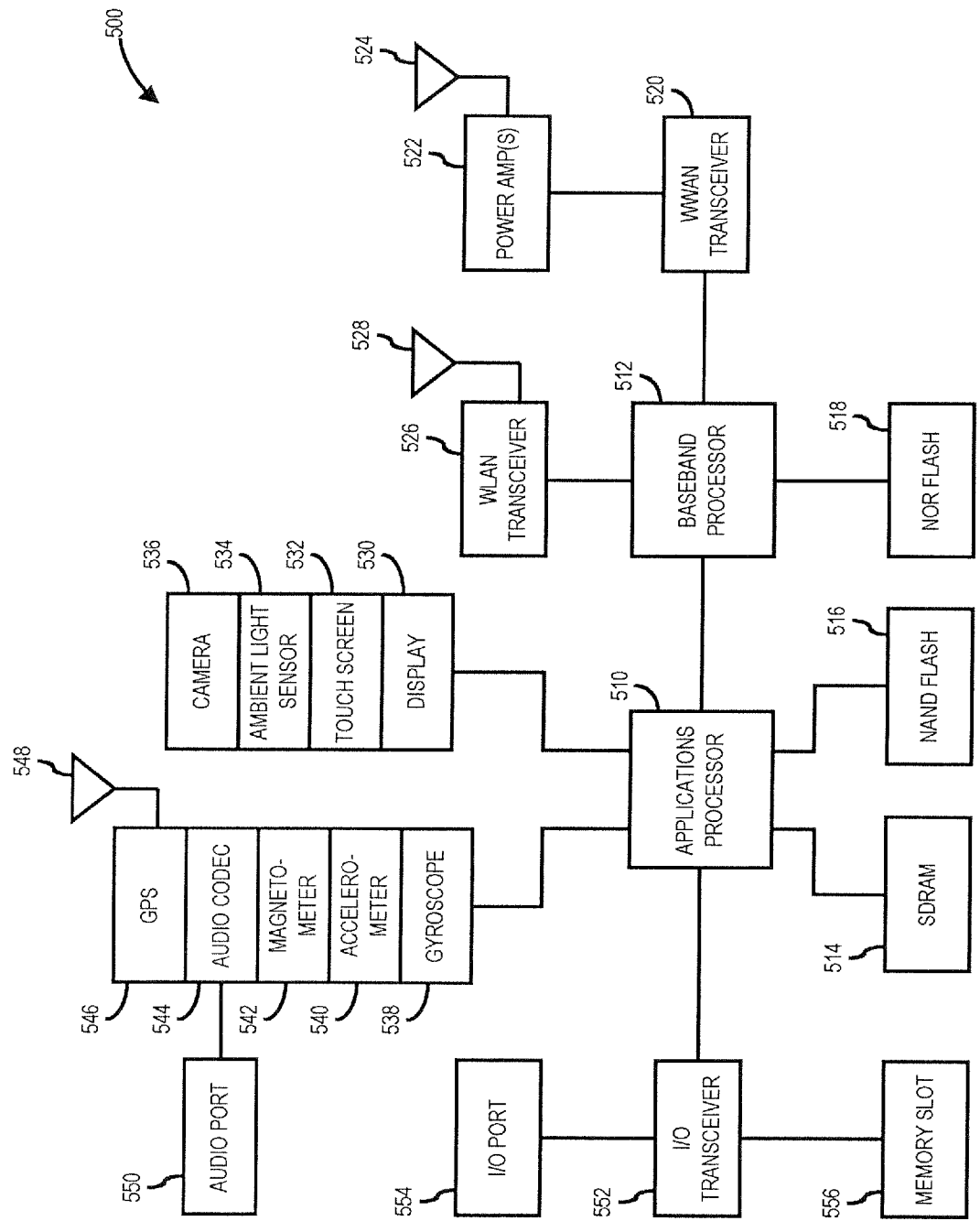
FIG. 5 is a block diagram of an information handling system capable of implementing radio-frequency and band capability for carrier aggregation measurement gap in accordance with one or more embodiments.

Referring now to FIG. 5, a block diagram of an information handling system capable of implementing radio-frequency and band capability for carrier aggregation measurement gap in accordance with one or more embodiments will be discussed. Information handling system 500 of FIG. 5 may tangibly embody any one or more of the network elements described herein, above, including for example the elements of network 100 with greater or fewer components depending on the hardware specifications of the particular device. In one embodiment, information handling system 500 may tangibly embody a user equipment (UE) comprising circuitry to connect to a network via a serving cell, indicate to the network a measurement gap capability of the UE, wherein the measurement gap capability includes information if the UE supports a carrier aggregation (CA) specific measurement gap and if the UE has two or more radio-frequency (RF) chains, and receive a CA specific measurement gap configuration from the network based on the two or more RF chains information. In another embodiment, information handling system may tangibly embody an apparatus of a user equipment (UE) comprising circuitry to connect to a network via a serving cell, indicate to the network a measurement gap capability of the UE, wherein the measurement gap capability includes a list of multiple bands for two or more radio-frequency (RF) chains of the UE with an indication of a measurement gap type for the multiple bands, and receive a measurement gap configuration from the network for the two or more RF chains. In yet another embodiment, information handling system 500 may tangibly embody an enhanced Node B (eNB) comprising circuitry to transmit a carrier aggregation (CA) specific measurement gap capability request to a user equipment (UE), receive a CA specific measurement gap capability response from the UE, and transmit a CA specific measurement gap configuration message to the UE to cause the UE to perform measurement gap measurements according to the configuration message. Although information handling system 500 represents one example of several types of computing platforms, information handling system 500 may include more or fewer elements and/or different arrangements of elements than shown in FIG. 5, and the scope of the claimed subject matter is not limited in these respects.

In one or more embodiments, information handling system 500 may include an application processor 510 and a baseband processor 512. Application processor 510 may be utilized as a general-purpose processor to run applications and the various subsystems for information handling system 500. Application processor 510 may include a single core or alternatively may include multiple processing cores. One or more of the cores may comprise a digital signal processor or digital signal processing (DSP) core. Furthermore, application processor 510 may include a graphics processor or coprocessor disposed on the same chip, or alternatively a graphics processor coupled to application processor 510 may comprise a separate, discrete graphics chip. Application processor 510 may include on board memory such as cache memory, and further may be coupled to external memory devices such as synchronous dynamic random access memory (SDRAM) 514 for storing and/or executing applications during operation, and NAND flash 816 for storing applications and/or data even when information handling system 500 is powered off. In one or more embodiments, instructions to operate or configure the information handling system 500 and/or any of its components or subsystems to operate in a manner as described herein may be stored on an article of manufacture comprising a non-transitory storage medium. In one or more embodiments, the storage medium may comprise any of the memory devices shown in and described herein, although the scope of the claimed subject matter is not limited in this respect. Baseband processor 512 may control the broadband radio functions for information handling system 500. Baseband processor 512 may store code for controlling such broadband radio functions in a NOR flash 518. Baseband processor 512 controls a wireless wide area network (WWAN) transceiver 520 which is used for modulating and/or demodulating broadband network signals, for example for communicating via a 3GPP LTE or LTE-Advanced network or the like.

In general, WWAN transceiver 520 may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 12), 3GPP Rel. 14 (3rd Generation Partnership Project Release 12), 3GPP LTE Extra, LTE Licensed-Assisted Access (LAA), UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, millimeter wave (mmWave) standards in general for wireless systems operating at 10-90 GHz and above such as WiGig, IEEE 802.1 lad, IEEE 802.1 lay, and so on, and/or general telemetry transceivers, and in general any type of RF circuit or RFI sensitive circuit. It should be noted that such standards may evolve over time, and/or new standards may be promulgated, and the scope of the claimed subject matter is not limited in this respect.

The WWAN transceiver 520 couples to one or more power amps 542 respectively coupled to one or more antennas 524 for sending and receiving radio-frequency signals via the WWAN broadband network. The baseband processor 512 also may control a wireless local area network (WLAN) transceiver 526 coupled to one or more suitable antennas 528 and which may be capable of communicating via a Wi-Fi, Bluetooth®, and/or an amplitude modulation (AM) or frequency modulation (FM) radio standard including an IEEE 802.11 a/b/g/n standard or the like. It should be noted that these are merely example implementations for application processor 510 and baseband processor 512, and the scope of the claimed subject matter is not limited in these respects. For example, any one or more of SDRAM 514, NAND flash 516 and/or NOR flash 518 may comprise other types of memory technology such as magnetic memory, chalcogenide memory, phase change memory, or ovonic memory, and the scope of the claimed subject matter is not limited in this respect.

In one or more embodiments, application processor 510 may drive a display 530 for displaying various information or data, and may further receive touch input from a user via a touch screen 532 for example via a finger or a stylus. An ambient light sensor 534 may be utilized to detect an amount of ambient light in which information handling system 500 is operating, for example to control a brightness or contrast value for display 530 as a function of the intensity of ambient light detected by ambient light sensor 534. One or more cameras 536 may be utilized to capture images that are processed by application processor 510 and/or at least temporarily stored in NAND flash 516. Furthermore, application processor may couple to a gyroscope 538, accelerometer 540, magnetometer 542, audio coder/decoder (CODEC) 544, and/or global positioning system (GPS) controller 546 coupled to an appropriate GPS antenna 548, for detection of various environmental properties including location, movement, and/or orientation of information handling system 500. Alternatively, controller 846 may comprise a Global Navigation Satellite System (GNSS) controller. Audio CODEC 544 may be coupled to one or more audio ports 550 to provide microphone input and speaker outputs either via internal devices and/or via external devices coupled to information handling system via the audio ports 550, for example via a headphone and microphone jack. In addition, application processor 510 may couple to one or more input/output (I/O) transceivers 552 to couple to one or more I/O ports 554 such as a universal serial bus (USB) port, a high-definition multimedia interface (HDMI) port, a serial port, and so on. Furthermore, one or more of the I/O transceivers 552 may couple to one or more memory slots 556 for optional removable memory such as secure digital (SD) card or a subscriber identity module (SIM) card, although the scope of the claimed subject matter is not limited in these respects.

Figure 6:
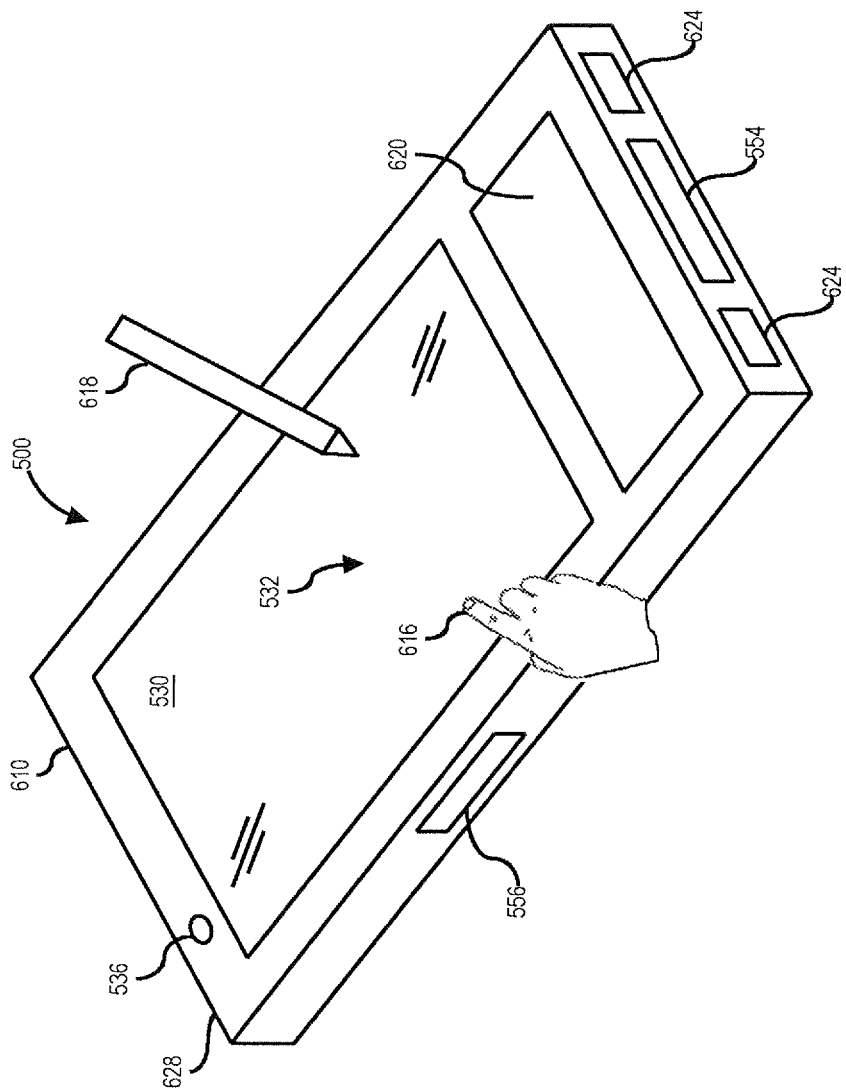
FIG. 6 is an isometric view of an information handling system of FIG. 6 that optionally may include a touch screen in accordance with one or more embodiments.

Referring now to FIG. 6, an isometric view of an information handling system of FIG. 5 that optionally may include a touch screen in accordance with one or more embodiments will be discussed. FIG. 6 shows an example implementation of information handling system 500 of FIG. 5 tangibly embodied as a cellular telephone, smartphone, or tablet type device or the like. The information handling system 500 may comprise a housing 610 having a display 530 which may include a touch screen 532 for receiving tactile input control and commands via a finger 616 of a user and/or a via stylus 618 to control one or more application processors 510. The housing 610 may house one or more components of information handling system 500, for example one or more application processors 510, one or more of SDRAM 514, NAND flash 516, NOR flash 518, baseband processor 512, and/or WWAN transceiver 520. The information handling system 500 further may optionally include a physical actuator area 620 which may comprise a keyboard or buttons for controlling information handling system via one or more buttons or switches. The information handling system 500 may also include a memory port or slot 556 for receiving non-volatile memory such as flash memory, for example in the form of a secure digital (SD) card or a subscriber identity module (SIM) card. Optionally, the information handling system 500 may further include one or more speakers and/or microphones 624 and a connection port 554 for connecting the information handling system 500 to another electronic device, dock, display, battery charger, and so on. In addition, information handling system 500 may include a headphone or speaker jack 628 and one or more cameras 536 on one or more sides of the housing 610. It should be noted that the information handling system 500 of FIG. 6 may include more or fewer elements than shown, in various arrangements, and the scope of the claimed subject matter is not limited in this respect.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 7:
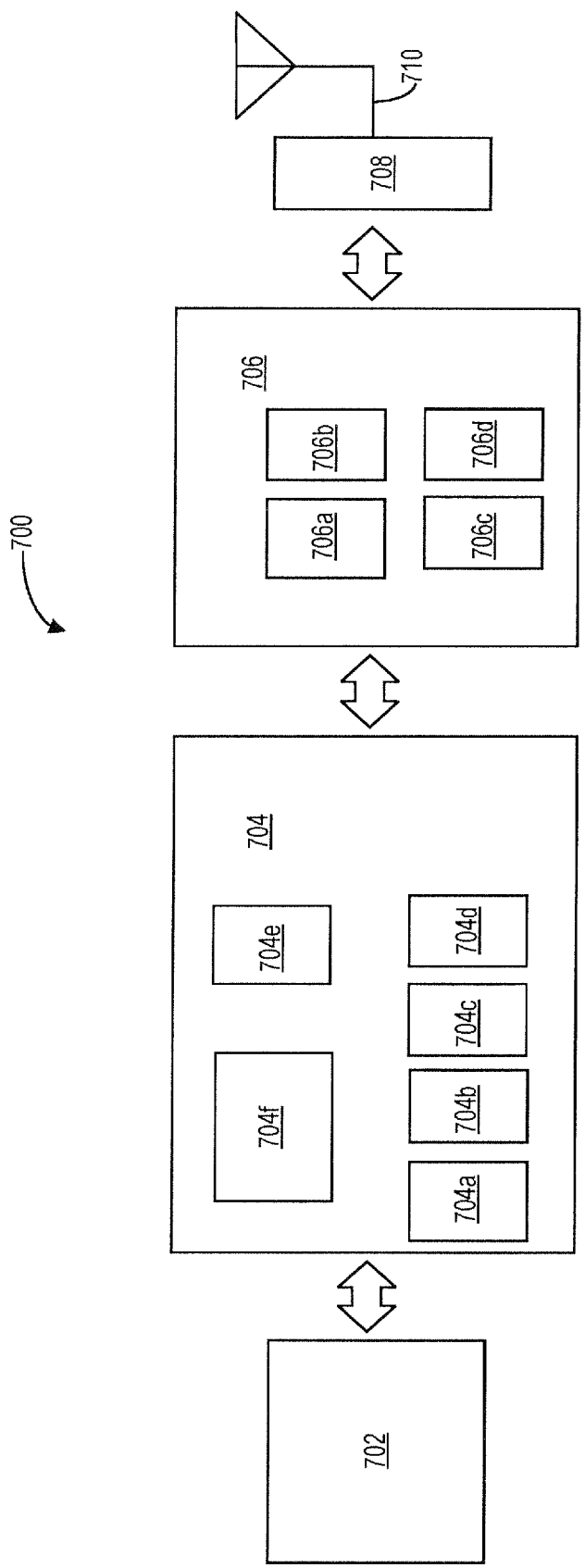
FIG. 7 is a diagram of example components of a wireless device in accordance with one or more embodiments.

Referring now to FIG. 7, example components of a wireless device such as User Equipment (UE) device 110 in accordance with one or more embodiments will be discussed. User equipment (UE) may correspond, for example, to UE 110 of network 100, although the scope of the claimed subject matter is not limited in this respect. In some embodiments, UE device 700 may include application circuitry 702, baseband circuitry 704, Radio Frequency (RF) circuitry 706, front-end module (FEM) circuitry 708 and one or more antennas 710, coupled together at least as shown.

Application circuitry 702 may include one or more application processors. For example, application circuitry 702 may include circuitry such as, but not limited to, one or more single-core or multi-core processors. The one or more processors may include any combination of general-purpose processors and dedicated processors, for example graphics processors, application processors, and so on. The processors may be coupled with and/or may include memory and/or storage and may be configured to execute instructions stored in the memory and/or storage to enable various applications and/or operating systems to run on the system.

Baseband circuitry 704 may include circuitry such as, but not limited to, one or more single-core or multi-core processors. Baseband circuitry 704 may include one or more baseband processors and/or control logic to process baseband signals received from a receive signal path of RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, in some embodiments, the baseband circuitry 704 may include a second generation (2G) baseband processor 704a, third generation (3G) baseband processor 704b, fourth generation (4G) baseband processor 704c, and/or one or more other baseband processors 704d for other existing generations, generations in development or to be developed in the future, for example fifth generation (5G), sixth generation (6G), and so on. Baseband circuitry 704, for example one or more of baseband processors 704a through 704d, may handle various radio control functions that enable communication with one or more radio networks via RF circuitry 706. The radio control functions may include, but are not limited to, signal modulation and/or demodulation, encoding and/or decoding, radio frequency shifting, and so on. In some embodiments, modulation and/or demodulation circuitry of baseband circuitry 704 may include Fast-Fourier Transform (FFT), precoding, and/or constellation mapping and/or demapping functionality. In some embodiments, encoding and/or decoding circuitry of baseband circuitry 804 may include convolution, tail-biting convolution, turbo, Viterbi, and/or Low Density Parity Check (LDPC) encoder and/or decoder functionality. Embodiments of modulation and/or demodulation and encoder and/or decoder functionality are not limited to these examples and may include other suitable functionality in other embodiments.

In some embodiments, baseband circuitry 704 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. Processor 704e of the baseband circuitry 704 may be configured to run elements of the protocol stack for signaling of the PHY, MAC, RLC, PDCP and/or RRC layers. In some embodiments, the baseband circuitry may include one or more audio digital signal processors (DSP) 704f. The one or more audio DSPs 704f may include elements for compression and/or decompression and/or echo cancellation and may include other suitable processing elements in other embodiments. Components of the baseband circuitry may be suitably combined in a single chip, a single chipset, or disposed on a same circuit board in some embodiments. In some embodiments, some or all of the constituent components of baseband circuitry 704 and application circuitry 702 may be implemented together such as, for example, on a system on a chip (SOC).

In some embodiments, baseband circuitry 704 may provide for communication compatible with one or more radio technologies. For example, in some embodiments, baseband circuitry 704 may support communication with an evolved universal terrestrial radio access network (EUTRAN) and/or other wireless metropolitan area networks (WMAN), a wireless local area network (WLAN), a wireless personal area network (WPAN). Embodiments in which baseband circuitry 804 is configured to support radio communications of more than one wireless protocol may be referred to as multi-mode baseband circuitry.

RF circuitry 706 may enable communication with wireless networks using modulated electromagnetic radiation through a non-solid medium. In various embodiments, RF circuitry 706 may include switches, filters, amplifiers, and so on, to facilitate the communication with the wireless network. RF circuitry 706 may include a receive signal path which may include circuitry to down-convert RF signals received from FEM circuitry 708 and provide baseband signals to baseband circuitry 704. RF circuitry 706 may also include a transmit signal path which may include circuitry to up-convert baseband signals provided by the baseband circuitry 704 and provide RF output signals to FEM circuitry 708 for transmission.

In some embodiments, RF circuitry 706 may include a receive signal path and a transmit signal path. The receive signal path of RF circuitry 706 may include mixer circuitry 706a, amplifier circuitry 706b and filter circuitry 706c. The transmit signal path of RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from FEM circuitry 708 based on the synthesized frequency provided by synthesizer circuitry 706d. Amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to baseband circuitry 704 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, mixer circuitry 706a of the transmit signal path may be configured to up-convert input baseband signals based on the synthesized frequency provided by synthesizer circuitry 706d to generate RF output signals for FEM circuitry 708. The baseband signals may be provided by the baseband circuitry 1004 and may be filtered by filter circuitry 706c. Filter circuitry 706c may include a low-pass filter (LPF), although the scope of the embodiments is not limited in this respect.

In some embodiments, mixer circuitry 706a of the receive signal path and the mixer circuitry 706a of the transmit signal path may include two or more mixers and may be arranged for quadrature down conversion and/or up conversion respectively. In some embodiments, mixer circuitry 706a of the receive signal path and the mixer circuitry 706a of the transmit signal path may include two or more mixers and may be arranged for image rejection, for example Hartley image rejection. In some embodiments, mixer circuitry 706a of the receive signal path and the mixer circuitry 706a may be arranged for direct down conversion and/or direct up conversion, respectively. In some embodiments, mixer circuitry 706a of the receive signal path and mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, RF circuitry 706 may include analog-to-digital converter (ADC) and digital-to-analog converter (DAC) circuitry, and baseband circuitry 704 may include a digital baseband interface to communicate with RF circuitry 706. In some dual-mode embodiments, separate radio integrated circuit (IC) circuitry may be provided for processing signals for one or more spectra, although the scope of the embodiments is not limited in this respect.

In some embodiments, synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

Synthesizer circuitry 706d may be configured to synthesize an output frequency for use by mixer circuitry 706a of RF circuitry 706 based on a frequency input and a divider control input. In some embodiments, synthesizer circuitry 706d may be a fractional N/N+1 synthesizer.

In some embodiments, frequency input may be provided by a voltage controlled oscillator (VCO), although that is not a requirement. Divider control input may be provided by either baseband circuitry 704 or applications processor 702 depending on the desired output frequency. In some embodiments, a divider control input (e.g., N) may be determined from a look-up table based on a channel indicated by applications processor 702.

Synthesizer circuitry 706d of RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1, for example based on a carry out, to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency, for example twice the carrier frequency, four times the carrier frequency, and so on, and used in conjunction with quadrature generator and divider circuitry to generate multiple signals at the carrier frequency with multiple different phases with respect to each other. In some embodiments, the output frequency may be a local oscillator (LO) frequency (fLO). In some embodiments, RF circuitry 1006 may include an in-phase and quadrature (IQ) and/or polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by RF circuitry 706 for transmission by one or more of the one or more antennas 710.

In some embodiments, FEM circuitry 708 may include a transmit/receive (TX/RX) switch to switch between transmit mode and receive mode operation. FEM circuitry 708 may include a receive signal path and a transmit signal path. The receive signal path of FEM circuitry 708 may include a low-noise amplifier (LNA) to amplify received RF signals and to provide the amplified received RF signals as an output, for example to RF circuitry 706. The transmit signal path of FEM circuitry 708 may include a power amplifier (PA) to amplify input RF signals, for example provided by RF circuitry 706, and one or more filters to generate RF signals for subsequent transmission, for example by one or more of antennas 710. In some embodiments, UE device 700 may include additional elements such as, for example, memory and/or storage, display, camera, sensor, and/or input/output (I/O) interface, although the scope of the claimed subject matter is not limited in this respect.

The following are example implementations of the subject matter described herein. It should be noted that any of the examples and the variations thereof described herein may be used in any permutation or combination of any other one or more examples or variations, although the scope of the claimed subject matter is not limited in these respects. In example one, a user equipment (UE) comprises circuitry to connect to a network via a serving cell, indicate to the network a measurement gap capability of the UE, wherein the measurement gap capability includes information if the UE supports a carrier aggregation (CA) specific measurement gap and if the UE has two or more radio-frequency (RF) chains, and receive a CA specific measurement gap configuration from the network based on the two or more RF chains information. In example two, the subject matter of example one or any of the examples described herein comprises circuitry to indicate the CA-specific measurement gap capability via at least one bit in UE capability information element. In example three, the subject matter of example one or any of the examples described herein comprises circuitry to indicate a list of frequency bands associated with the two or more RF chains with indication of whether one or more of the RF chains should be utilized to perform measurements on the list of multiple bands with configuring measurement gap. In example four, the subject matter of example one or any of the examples described herein comprises circuitry to indicate a list of bands associated with the two or more RF chains with indication of a measurement gap type to perform measurement on the list of frequency bands. In example five, the subject matter of example one or any of the examples described herein comprises circuitry to indicate the association between a list of bands and the two or more RF chains via an RF index. In example six, the subject matter of example one or any of the examples described herein comprises circuitry to indicate a list of bands for the two or more RF chains with indication of whether one or more of the bands is required for measurement gap measurements configuration, wherein if a band is not required for measurement gap measurements indicates a downlink transmission on a serving frequency of the serving cell and the UE can receive the downlink transmission on the serving frequency without interruption. In example seven, the subject matter of example one or any of the examples described herein comprises circuitry to indicate the measurement gap capability of the UE via radio resource control (RRC) signaling. In example eight, the subject matter of example one or any of the examples described herein comprises circuitry, wherein the measurement gap capability includes an indication of whether the UE supports a specific RF band request from the network. In example nine, the subject matter of example one or any of the examples described herein comprises circuitry to transmit RRC signaling to the network including a response to a request from the network for the measurement gap capability of the UE. In example ten, the subject matter of example one or any of the examples described herein comprises circuitry to perform measurement gap measurements according to the CA-specific measurement gap configuration received from the network.

In example eleven, an apparatus of a user equipment (UE) comprises circuitry to connect to a network via a serving cell, indicate to the network a measurement gap capability of the UE, wherein the measurement gap capability includes a list of multiple bands for two or more radio-frequency (RF) chains of the UE with an indication of a measurement gap type for the multiple bands, and receive a measurement gap configuration from the network for the two or more RF chains. In example twelve, the subject matter of example eleven or any of the examples described herein comprises circuitry, wherein the gap type can be a regular measurement gap, a mini gap, or no gap required, or subset thereof, or a combination thereof. In example thirteen, the subject matter of example eleven or any of the examples described herein comprises circuitry, wherein the mini gap indicates there will be downlink transmission on a serving frequency of the serving cell, and the UE can receive the downlink transmission on the serving frequency using another frequency with a smaller valued interruption.

In example fourteen, an enhanced Node B (eNB) comprises circuitry to transmit a carrier aggregation (CA) specific measurement gap capability request to a user equipment (UE), receive a CA specific measurement gap capability response from the UE, and transmit a CA specific measurement gap configuration message to the UE to cause the UE to perform measurement gap measurements according to the configuration message. In example fifteen, the subject matter of example fourteen or any of the examples described herein comprises circuitry, wherein the measurement gap capability response includes information if the UE supports a carrier aggregation (CA) specific measurement gap and if the UE has two or more radio-frequency (RF) chains, wherein the enhanced Node B comprises circuitry to transmit the CA-specific measurement gap configuration message to the UE with measurement gap configuration information for the two or more RF chains.

In example sixteen, one or more computer-readable media have instructions stored thereon that, if executed by user equipment (UE), result in connecting to a network via a serving cell, indicating to the network a measurement gap capability of the UE, wherein the measurement gap capability includes information if the UE supports a carrier aggregation (CA) specific measurement gap and if the UE has two or more radio-frequency (RF) chains, and receiving a CA specific measurement gap configuration from the network for the two or more RF chains. In example seventeen, the subject matter of example sixteen or any of the examples described herein comprises instructions, if executed by the UE, further result in indicating the measurement gap capability via at least one bit in UE capability information element. In example eighteen, the subject matter of example sixteen or any of the examples described herein comprises instructions, if executed by the UE, further to result in indicating a list of multiple bands for the two or more RF chains with indication of whether one or more of the bands should be utilized for measurement gap measurements. In example nineteen, the subject matter of example sixteen or any of the examples described herein comprises instructions, if executed by the UE, further to result in indicating a list of multiple bands for the two or more RF chains with indication of a measurement gap type for the multiple bands. In example twenty, the subject matter of example sixteen or any of the examples described herein comprises instructions, further to result in indicating a list of multiple bands for the two or more RF chains via an RF index. In example twenty-one, the subject matter of example sixteen or any of the examples described herein comprises instructions, if executed by the UE, further to result in indicating a list of multiple bands for the two or more RF chains with indication of whether one or more of the bands is required for measurement gap measurements, wherein if a band is not required for measurement gap measurements indicates a downlink transmission on a serving frequency of the serving cell and the UE can receive the downlink transmission on the serving frequency without interruption. In example twenty-two, the subject matter of example sixteen or any of the examples described herein comprises instructions, if executed by the UE, further to result in indicating the measurement gap capability of the UE via radio resource control (RRC) signaling. In example twenty-three, the subject matter of example sixteen or any of the examples described herein comprises instructions, wherein the measurement gap capability includes an indication of whether the UE supports a specific RF band request from the network In example twenty-four, the subject matter of example sixteen or any of the examples described herein comprises instructions, if executed by the UE, further to result in transmitting radio resource control (RRC) signaling to the network including a response to a request from the network for the measurement gap capability of the UE. In example twenty-five, the subject matter of example sixteen or any of the examples described herein comprises instructions, if executed by the UE, further to result in performing measurement gap measurements according to the CA specific measurement gap configuration received from the network.

Although the claimed subject matter has been described with a certain degree of particularity, it should be recognized that elements thereof may be altered by persons skilled in the art without departing from the spirit and/or scope of claimed subject matter. It is believed that the subject matter pertaining to user equipment radio-frequency and band capability for carrier aggregation measurement gap and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
    at a user equipment (UE) equipped with multiple radio frequency (RF) chains:
        decoding a first message received from a base station, the first message including a request for the UE to provide a measurement gap preference information element (IE) to the base station, the measurement gap preference IE configured to indicate a preference for one type of measurement gap from a set of three different types of measurement gaps including: i) a regular measurement gap, ii) a small measurement gap, and iii) no measurement gap;
        encoding a second message to be sent to the base station, the second message comprising (i) the measurement gap preference IE, (ii) an indication of whether the UE supports per serving cell measurement gap, (iii) an indication of a number of frequencies to be measured by the UE and (iv) a serving identifier for two or more cells configured for carrier aggregation for the UE, wherein the second message comprises a radio resource control (RRC) message;
        receiving an indication of a carrier aggregation specific measurement gap configuration; and
        performing measurement gap measurements according to the carrier aggregation specific measurement gap configuration.

2. The method according to claim 1, wherein the second message further comprises an indication of whether the UE supports a specific RF band request from the base station.

3. The method of claim 1, wherein the first message is received via radio resource control (RRC) signaling.

4. The method of claim 1, wherein the carrier aggregation specific measurement gap configuration controls the setup of one or more measurement gaps at the UE.

5. A method, comprising:
    at a base station:
        encoding a first message to be sent to a user equipment (UE) equipped with multiple radio frequency (RF) chains, the first message including a request for the UE to provide a measurement gap preference information element (IE) to the base station, the measurement gap preference IE configured to indicate a UE preference for one type of measurement gap from a set of three different types of measurement gaps including: i) a regular measurement gap, ii) a small measurement gap, or iii) no measurement gap;
        decoding a second message received from the UE, wherein the second message includes (i) the measurement gap preference IE, (ii) an indication of whether the UE supports per serving cell measurement gap, (iii) an indication of a number of frequencies to be measured by the UE and (iv) a serving identifier for two or more cells configured for carrier aggregation for the UE, wherein the second message comprises a radio resource control (RRC) message; and
        transmitting an indication of a carrier aggregation specific measurement gap configuration to the UE, wherein the UE performs measurement gap measurements according to the carrier aggregation specific measurement gap configuration.

6. The method of claim 5, further comprising:
    transmitting the first message to the UE via radio resource control (RRC) signaling.

7. The method of claim 5, wherein the carrier aggregation specific measurement gap configuration controls the setup of one or more measurement gaps at the UE.

8. An integrated circuit, comprising:
    circuitry configured to decode a first message received from a base station, the first message including a request to provide a measurement gap preference information element (IE), the measurement gap preference IE configured to indicate a preference for one type of measurement gap from a set of three different types of measurement gaps including: i) a regular measurement gap, ii) a small measurement gap, and iii) no measurement gap;

circuitry configured to encode a second message comprising (i) the measurement gap preference IE, (ii) an indication of whether the UE supports per serving cell measurement gap, (iii) an indication of a number of frequencies to be measured by the UE and (iv) a serving identifier for two or more cells configured for carrier aggregation for the UE, wherein the second message comprises a radio resource control (RRC) message;

circuitry configured to receive an indication of a carrier aggregation specific measurement gap configuration; and circuitry configured to perform measurement gap measurements according to the carrier aggregation specific measurement gap configuration.

9. The integrated circuit according to claim 8, wherein the second message further comprises an indication of whether the UE supports a specific RF band request from the base station.

10. The integrated circuit of claim 8, wherein the first message is received via radio resource control (RRC) signaling.

11. The integrated circuit of claim 8, wherein the carrier aggregation specific measurement gap configuration controls the setup of one or more measurement gaps at the UE.

* * * * *